United States Patent
Kudva et al.

(10) Patent No.: US 11,594,962 B2
(45) Date of Patent: Feb. 28, 2023

(54) TECHNIQUES TO IMPROVE CURRENT REGULATOR CAPABILITY TO PROTECT THE SECURED CIRCUIT FROM POWER SIDE CHANNEL ATTACK

(71) Applicant: NVIDIA Corp., Santa Clara, CA (US)

(72) Inventors: Sudhir Shrikantha Kudva, Dublin, CA (US); Nikola Nedovic, San Jose, CA (US); Sanquan Song, Mountain View, CA (US)

(73) Assignee: NVIDIA CORP., Santa Clara, CA (US)

( * ) Notice: Subject to any disclaimer, the term of this patent is extended or adjusted under 35 U.S.C. 154(b) by 0 days.

(21) Appl. No.: 17/580,226

(22) Filed: Jan. 20, 2022

(65) Prior Publication Data

US 2022/0149728 A1    May 12, 2022

Related U.S. Application Data

(62) Division of application No. 16/856,884, filed on Apr. 23, 2020, now Pat. No. 11,283,349.

(51) Int. Cl.
*H02M 3/155* (2006.01)

(52) U.S. Cl.
CPC ................... *H02M 3/155* (2013.01)

(58) Field of Classification Search
None
See application file for complete search history.

(56) References Cited

U.S. PATENT DOCUMENTS

| 5,045,804 A | 9/1991 | Sugawara et al. |
| 5,600,187 A | 2/1997 | El-Hamamsy et al. |
| 6,269,763 B1 | 8/2001 | Woodland |
| 6,275,395 B1 | 8/2001 | Inn et al. |
| 6,281,731 B1 | 8/2001 | Fifield et al. |
| 6,414,519 B1 | 7/2002 | Abernathy |
| 6,498,751 B2 | 12/2002 | Ordonez et al. |
| 8,816,748 B2 | 8/2014 | Kumar et al. |
| 9,024,678 B2 | 5/2015 | Cavalotto et al. |
| 9,135,453 B2 * | 9/2015 | Shen-Orr .............. G06F 21/755 |
| 9,158,316 B2 | 10/2015 | Theiler |
| 9,509,707 B2 | 11/2016 | Patne et al. |
| 9,721,093 B2 | 8/2017 | Poornachandran et al. |
| 9,755,822 B2 | 9/2017 | Han et al. |
| 9,774,614 B2 | 9/2017 | Patne et al. |
| 9,787,171 B2 | 10/2017 | Fort |
| 9,812,954 B1 | 11/2017 | Kose et al. |
| 9,891,639 B2 | 2/2018 | Fort et al. |
| 9,970,986 B2 | 5/2018 | Hampel et al. |
| 10,042,380 B1 | 8/2018 | Hung et al. |

(Continued)

OTHER PUBLICATIONS

Carlos Tokunaga et al. "Secure AES Engine with Local switched-capacitor current equalizer", IEEE Solid State Circuits Conference (ISSCC), 2009, pp. 64-65.

(Continued)

*Primary Examiner* — Jeffery S Zweizig

(74) *Attorney, Agent, or Firm* — Rowan TELS LLC

(57) ABSTRACT

This disclosure relates to current flattening circuits for an electrical load. The current flattening circuits incorporate randomize various parameters to add noise onto the supply current. This added noise may act to reduce the signal to noise ratio in the supply current, increasing the difficulty of identifying a computational artifact signal from power rail noise.

21 Claims, 6 Drawing Sheets

(56) References Cited

U.S. PATENT DOCUMENTS

| | | |
|---|---|---|
| 10,389,519 B2 | 8/2019 | Cheng et al. |
| 10,423,207 B2 | 9/2019 | Reed et al. |
| 10,958,414 B2 | 3/2021 | Stark |
| 11,227,190 B1 | 1/2022 | Li et al. |
| 11,283,349 B2 | 3/2022 | Kudva et al. |
| 11,348,000 B1 | 5/2022 | Ding et al. |
| 2005/0275464 A1 | 12/2005 | Filoramo et al. |
| 2007/0094623 A1 | 4/2007 | Chen et al. |
| 2016/0190988 A1 | 6/2016 | Lin et al. |
| 2018/0006638 A1 | 1/2018 | Chen et al. |
| 2019/0007223 A1 | 1/2019 | Vaidya et al. |
| 2019/0121928 A1 | 4/2019 | Wu et al. |
| 2020/0151288 A1 | 5/2020 | Ma et al. |
| 2020/0210805 A1 | 7/2020 | Drozdowski et al. |
| 2020/0302250 A1 | 9/2020 | Chu et al. |
| 2020/0327417 A1 | 10/2020 | Xie et al. |
| 2021/0334411 A1 | 10/2021 | Nedovic et al. |
| 2022/0004875 A1 | 1/2022 | Koike-Akino et al. |
| 2022/0027546 A1 | 1/2022 | Ren et al. |
| 2022/0058466 A1 | 2/2022 | Yang et al. |
| 2022/0245425 A1 | 8/2022 | Sheikh et al. |

OTHER PUBLICATIONS

FSP1759_2-20-2020 8-49-52 AM SCA_paper_ISSCC2020.

Girish B. Ratanpal et al. "An On-Chip Signal Suppression Countermeasure to Power Analysis Attacks", IEEE Transactions on dependable and secure computing, July-Sep. 2004, pp. 179-189.

Radu Muresan et al. "Protection Circuit against Differential Power Analysis Attacks for Smart Cards", IEEE Transactions on Computers, vol. 57, No. 11, p. 1540-1549, Nov. 2008.

Oleg Garitselov1; Fast-Accurate Non-Polynomial Metamodeling for nano-CMOS PLL Design Optimization; IEEE:2012; pp. 317-321.

* cited by examiner

TECHNIQUES TO IMPROVE CURRENT REGULATOR CAPABILITY TO PROTECT THE SECURED CIRCUIT FROM POWER SIDE CHANNEL ATTACK

BACKGROUND

In computer security, a side-channel attack is any attack based on information gained from the implementation of a computer system, rather than weaknesses in the implemented algorithm itself (e.g., cryptanalysis and software bugs). Timing information, power consumption, and electromagnetic leaks can provide information on the operation of the system that may be exploited.

Some side-channel attacks utilize technical knowledge of the internal operation of the system, while others, such as differential power analysis, are effective as black-box attacks. Differential power analysis (DPA) is a side-channel attack that involves analyzing power consumption measurements from a system, often using statistical methods. The attack exploits leakage of internal power consumption information back to supply pins external to the circuit package. Varying power consumption can occur when microprocessors or other secure hardware perform secure operations such as cryptographic algorithms using secret keys. Using DPA, an adversary can obtain information at the package pins regarding power consumption from multiple operations performed by a secure load in an electronic device.

One approach to protecting against side-channel attacks utilizes circuits that prevent the power fluctuations that arise from computations in protected circuits from propagating back to pins of the circuit package, where such fluctuations may be exploited. Circuits providing such prevention are known as "current flattening circuits".

BRIEF SUMMARY

This disclosure relates to a current flattening circuit for an electrical load. A constant current source is coupled between the load and a power supply. A randomizer perturbs the constant current source output. A controlled current shunt is configured to respond to a load voltage to generate a shunt current for the load.

This disclosure further relates to a current flattening circuit comprising a current shunt and a comparator each coupled in parallel with a load. A reference voltage is coupled to one or more inputs of the comparator, and a randomizer is configured to perturb the reference voltage. The comparator is configured to control the current shunt.

This disclosure also relates to a current flattening circuit with at least one transistor interposed between a power supply and a load. A current shunt is coupled to a load voltage node between the transistor and the load. A comparator is coupled to the load voltage node and to a reference voltage and is coupled to control the current shunt. A randomizer is coupled to perturb a clock driving the load and in some implementations, also to the reference voltage.

Additionally, this disclosure relates to a circuit comprising a load, a dummy load, and a switch. The load is configured to perform a transformation of a true input. The dummy load is configured to perform a transformation of a dummy input. The switch is configured to direct a clock edge to either the load or the dummy load.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments of circuits are disclosed incorporating a current regulator into current flattening circuits to detect the transient behavior of a load current, process the detected load current, and to generate a regulated current that is complimentary current. "Complimentary current" refers to a current mirroring amplitude variations of another current. The sum of the load and regulated currents gives the supply load current, which in an ideal case may be direct current. The alternating current value of this supply load current may be treated as being zero at all frequencies in an ideal circuit designed to protect against side-channel attacks.

The disclosed circuits further incorporate a randomizer. "Randomizer" refers to a circuit that generates a randomized signal. Herein, this also refers to circuits that generate pseudo-random signals. Randomizing various parameters within the current flattening circuits may add noise onto the supply current. This added noise may act to reduce the signal to noise ratio in the supply current, increasing the difficultly of a data-revealing signal being detected from power rail noise. By varying different parameters within the current flattening circuits, signal to noise ratios in the power supply current may be reduced, adding additional security. The disclosed circuits incorporate noise addition by variation of reference in a current regulator, variation of load clock frequency to add timing noise, and combination of both (i.e., reference variation and load clock variation).

Figure 1:
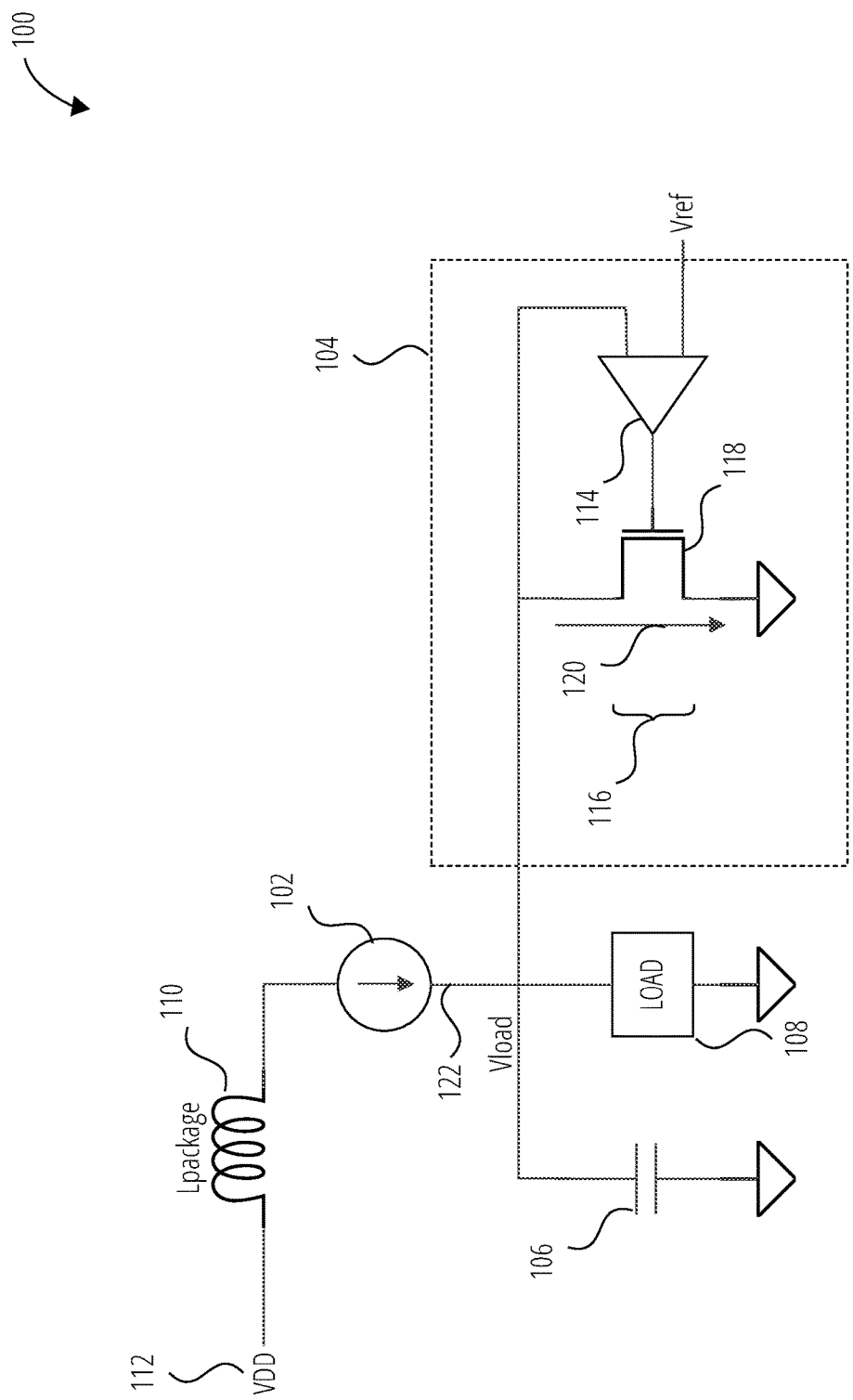
FIG. 1 depicts a current flattening circuit 100 in accordance with one embodiment.

FIG. 1 depicts current flattening circuit 100 in one embodiment. At a high level, the current flattening circuit 100 comprises a constant current source 102, a high bandwidth current regulator 104, and a filter capacitor 106 configured to protect a circuit load 108 from side-channel attacks. A parasitic inductance due to package architecture is modeled as package inductance 110 between the power supply 112 and the constant current source 102. "Constant current source" refers to a circuit configured to regulate its output current toward a constant level that is determined by its input control signal(s). "Current regulator" refers to a circuit that generates a control input signal to a constant or controlled current source.

The high bandwidth current regulator 104 comprises a differential amplifier 114 that compares the load voltage $V_{load}$ with a reference voltage Vref and generates a proportional control output to the gate of a controlled current shunt 116, such as Shunt transistor 118. The controlled current shunt 116 generates a shunt current 120, i.e., a complimentary current of load current AC components, and thus prevents these components from propagating back to the power supply 112 package pin. "Controlled current shunt" refers to a circuit configured to output an amount of shunt current based on its input control signal(s).

The constant current source 102, generating a load current 122, may be implemented using a stack of transistors in series, with finite output impedance $r_0$. The high bandwidth current regulator 104 mitigates the leakage of load voltage/load current information through $r_0$ by shunting load current transients to ground. The filter capacitor 106 helps maintain $V_{load}$ at a constant level in the presence of the dynamic shunt current 120 (complimentary current) that is generated by the high bandwidth current regulator 104.

Figure 2:
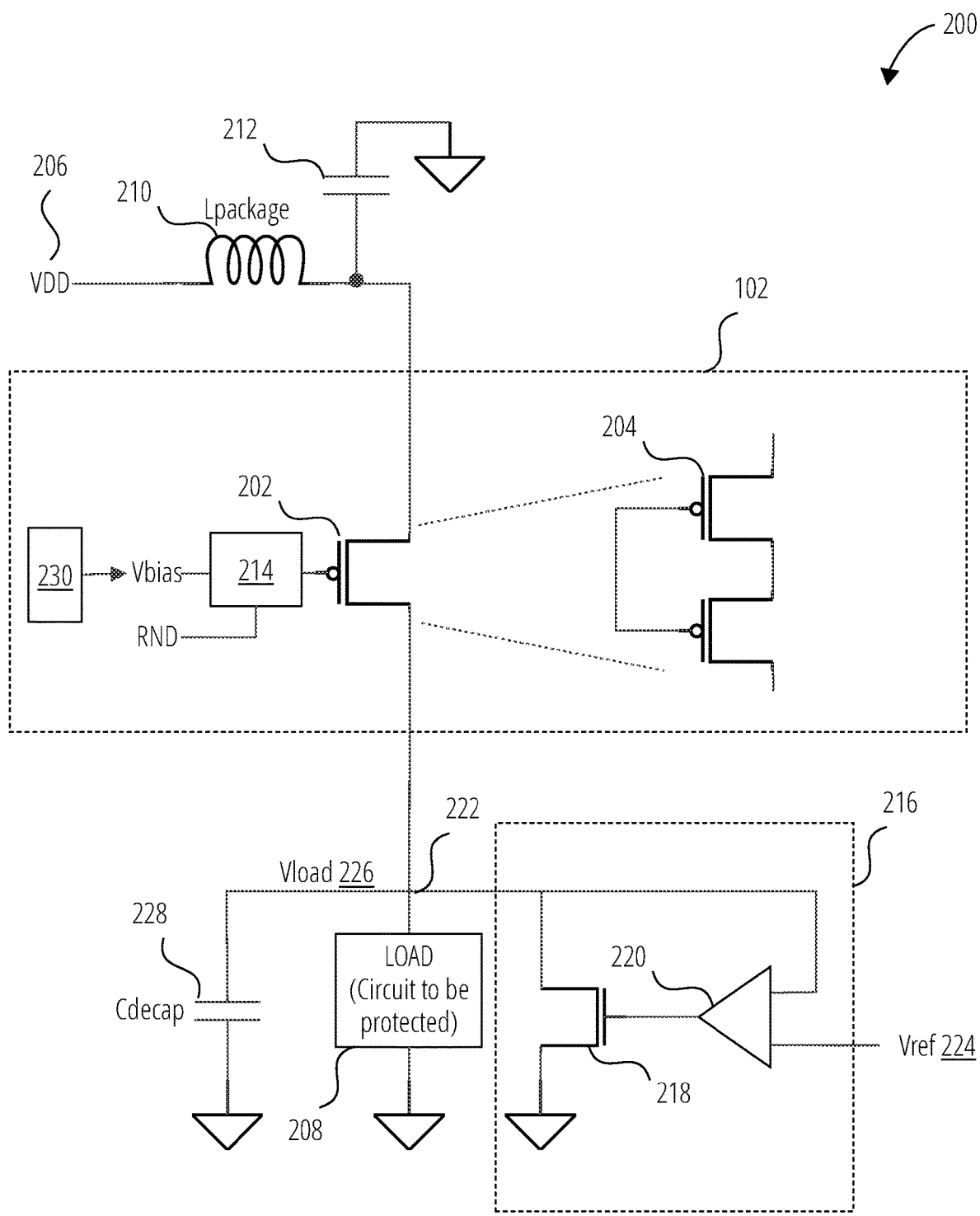
FIG. 2 depicts a current flattening circuit 200 in accordance with one embodiment.

FIG. 2 depicts a current flattening circuit 200 in an embodiment in which the constant current source 102 comprises a PMOS transistor 202 or PMOS transistor stack 204. At least one PMOS transistor 202 may be interposed between the power supply 206 and the circuit load 208. The PMOS transistor 202 may be electrically modelled, conceptually, as a constant current source in parallel with a resistance $r_0$. This output impedance $r_0$ of the constant current source 102 may be improved by stacking one or more pass-gate transistors.

The bias voltage $V_{bias}$ for the constant current source 102 may be generated by a bandgap reference generator 230. A digital-to-analog converter 214 may have inputs coupled to $V_{bias}$ and a random code RND generated by a random signal generator. The random code may be generated at a rate that matches the bandwidth of the current regulator 216. The output of the digital-to-analog converter 214 may control the constant current source 102, for example by driving the gate or gates of the PMOS transistor 202 or PMOS transistor stack 204, respectively. The digital-to-analog converter 214 thus configured may act as a randomizer to perturb the constant current source 102.

A parasitic inductance due to package architecture is modeled as package inductance 210 between the power supply 206 and the constant current source 102. A capacitor 212 may be configured between the power supply 206 and ground to provide a high frequency noise path to ground for noise on the power supply 206 line. The capacitor 212 may also model package parasitic capacitance.

A current regulator 216 may comprise an NMOS transistor 218 and a differential amplifier 220 each coupled to a node 222 between the at least one PMOS transistor 202 and the circuit load 208. The NMOS transistor 218 may act as a shunt transistor. The shunt transistor gate voltage may be configured to be controlled by the differential amplifier 220. The differential amplifier 220 may be coupled to compare a reference voltage 224 and a load voltage 226. A filter capacitor 228 may be configured between the node 222 and ground in order to provide a path to ground for noise on the load voltage 226 line.

Figure 3:
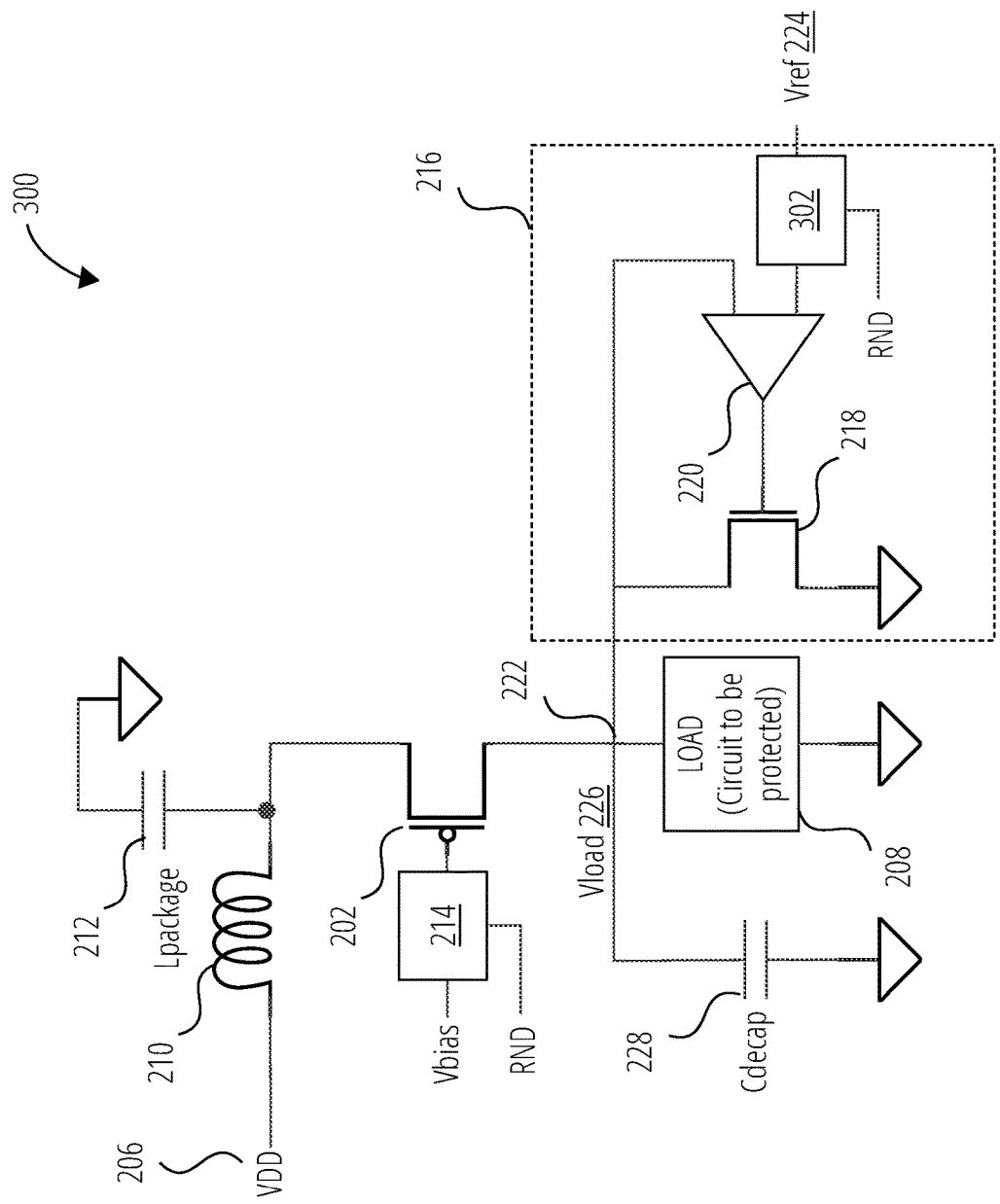
FIG. 3 depicts a current flattening circuit 300 in accordance with one embodiment.

FIG. 3 depicts a current flattening circuit 300 in one embodiment. The current flattening circuit 300 comprises elements in common with the current flattening circuit 200 but also differs in the following respects.

The current flattening circuit 300 may incorporate a digital-to-analog converter 302 coupled to the reference voltage 224 and a randomized signal RND as part of the current regulator 216. The digital-to-analog converter 302 output may be coupled to one input of the differential amplifier 220, the load voltage 226 being coupled to the other input of the differential amplifier 220. The output of the differential amplifier 220 may control the gate of NMOS transistor 218, which may act as a controlled current shunt, similar to the configuration illustrated in FIG. 2.

The current regulator 216 acts as a controlled current source configured to respond to the load voltage 226. The NMOS transistor 218 is configured to receive a gate voltage proportional to a comparison of the reference voltage 224 and the load voltage 226. The reference voltage 224 may be a bandgap voltage input to a digital-to-analog converter 302, e.g., from the bandgap reference generator 230 used to generate $V_{bias}$, and a randomizer may be configured by randomly perturbing the output of the digital-to-analog converter 302 to the differential amplifier 220.

Depending on the implementation, the current flattening circuit 300 may utilize randomization at the PMOS transistor 202, at the differential amplifier 220, or both.

Figure 4:
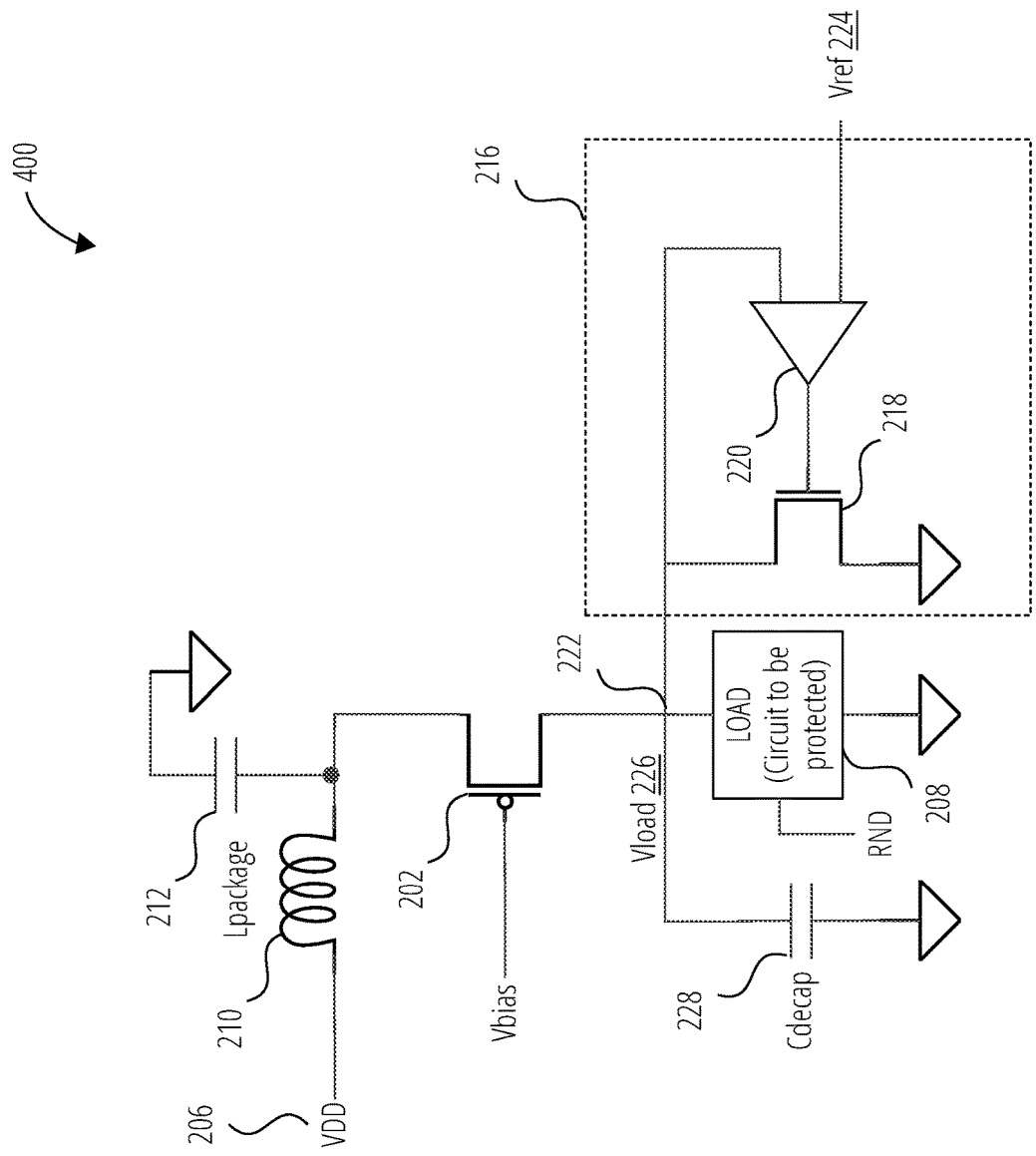
FIG. 4 depicts a current flattening circuit 400 in accordance with one embodiment.

FIG. 4 depicts a current flattening circuit 400 in one embodiment. The comprises elements in common with the current flattening circuit 200 but also differs in the following respects. In the current flattening circuit 400 illustrated, the constant current source 102 may be controlled by the bias voltage $V_{bias}$ directly, e.g., as the gate voltage of one or more PMOS transistor 202, rather than $V_{bias}$ being first transformed by a digital-to-analog converter (such as digital-to-analog converter 214 shown in FIG. 2). In this configuration a randomized signal RND may be coupled to perturb the circuit load 208. RND may be a randomized clocking signal generated by the randomized clocking circuit 500 illustrated in FIG. 5. The use of a randomized clocking signal in this fashion may be used as depicted in the current flattening circuit 400 or complementary with the embodiments depicted in FIG. 2 or FIG. 3.

A comparator for controlling the shunt current is implemented in the current regulator 216 using a differential amplifier 220 with input terminals coupled to a reference voltage 224 and the load voltage 226 (the reference voltage 224 source may be generated by a bandgap voltage source). Alternatively, the comparator may be implemented as depicted in FIG. 4.

Figure 5:
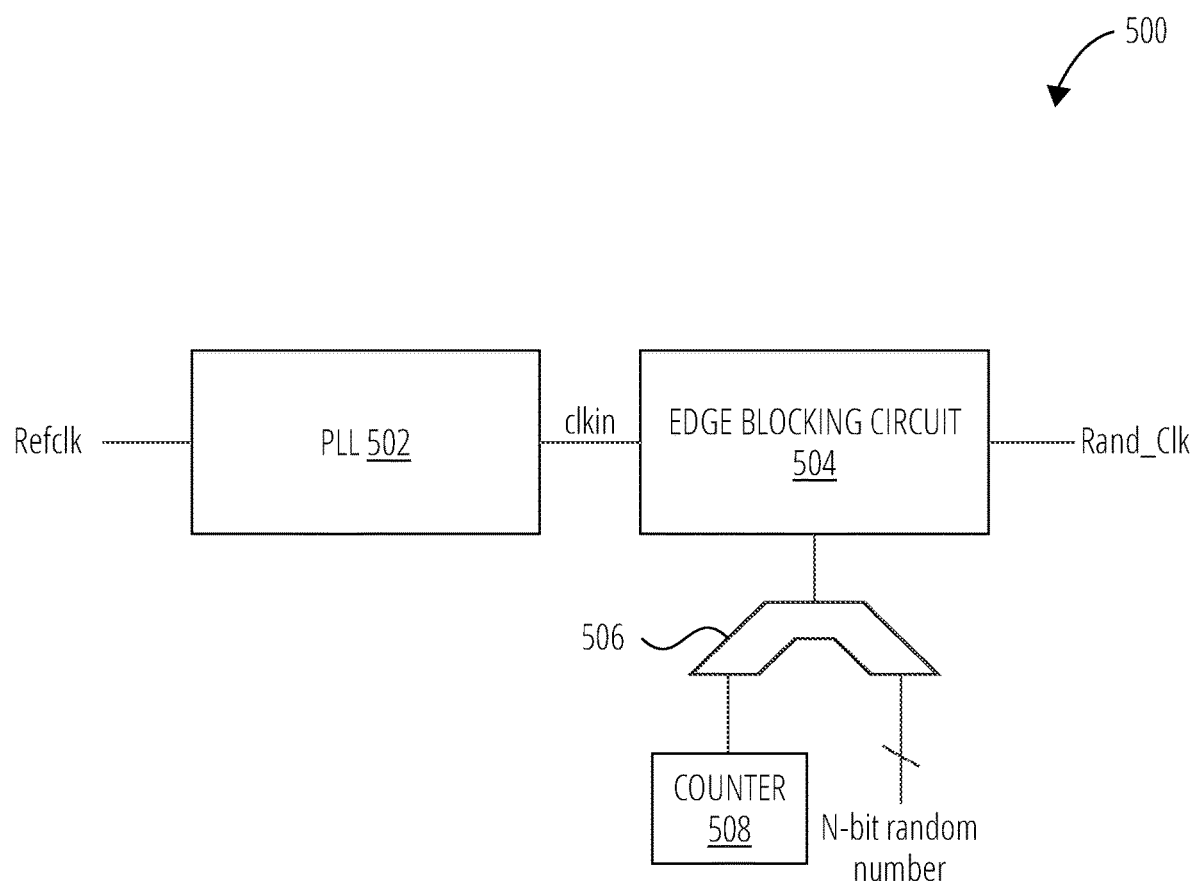
FIG. 5 depicts a randomized clocking circuit 500 in accordance with one embodiment.

FIG. 5 depicts a randomized clocking circuit 500 in one embodiment. At a high level, the randomized clocking circuit 500 comprises a phase locked loop 502, an edge blocking circuit 504, a comparator 506, and a counter 508. In the depicted embodiment the high-level components are coupled as follows. A reference clock signal "Refclk" is coupled to the input of the phase locked loop 502. The output of the phase locked loop 502 is a clock signal "clkin" coupled to one input of the edge blocking circuit 504. One input of a comparator 506 is coupled to the counter 508 and another input of the comparator 506 receives an N-bit random number. The comparator 506 compares these inputs and asserts an output to the edge blocking circuit 504 when the counter 508 value does not meet a comparison metric (e.g., is not equal to the N-bit random number), at which point the counter 508 value may be reset. The edge blocking circuit 504 perturbs the clock driving the circuit load 208 by blocking a clocking edge of clkin when the comparator 506 output is asserted to produce a randomized clock output "Rand_Clk". The Rand_Clk signal drives the circuit load 208 as depicted in FIG. 4.

The phase locked loop 502, may be configured to generate "clkin" at a frequency higher than a clock frequency at which the circuit load 208 operates. The edge blocking circuit 504 generates a randomized blocking signal responsive to the output of the comparator 506, based on counter 508 and the N-bit random number.

Those of ordinary skill in the art may readily recognize that the randomized clocking circuit 500 may comprise additional or different elements not depicted and unnecessary to this description. The randomized clocking circuit 500 may be incorporated into any of the embodiments depicted in FIG. 2-FIG. 4.

Figure 6:
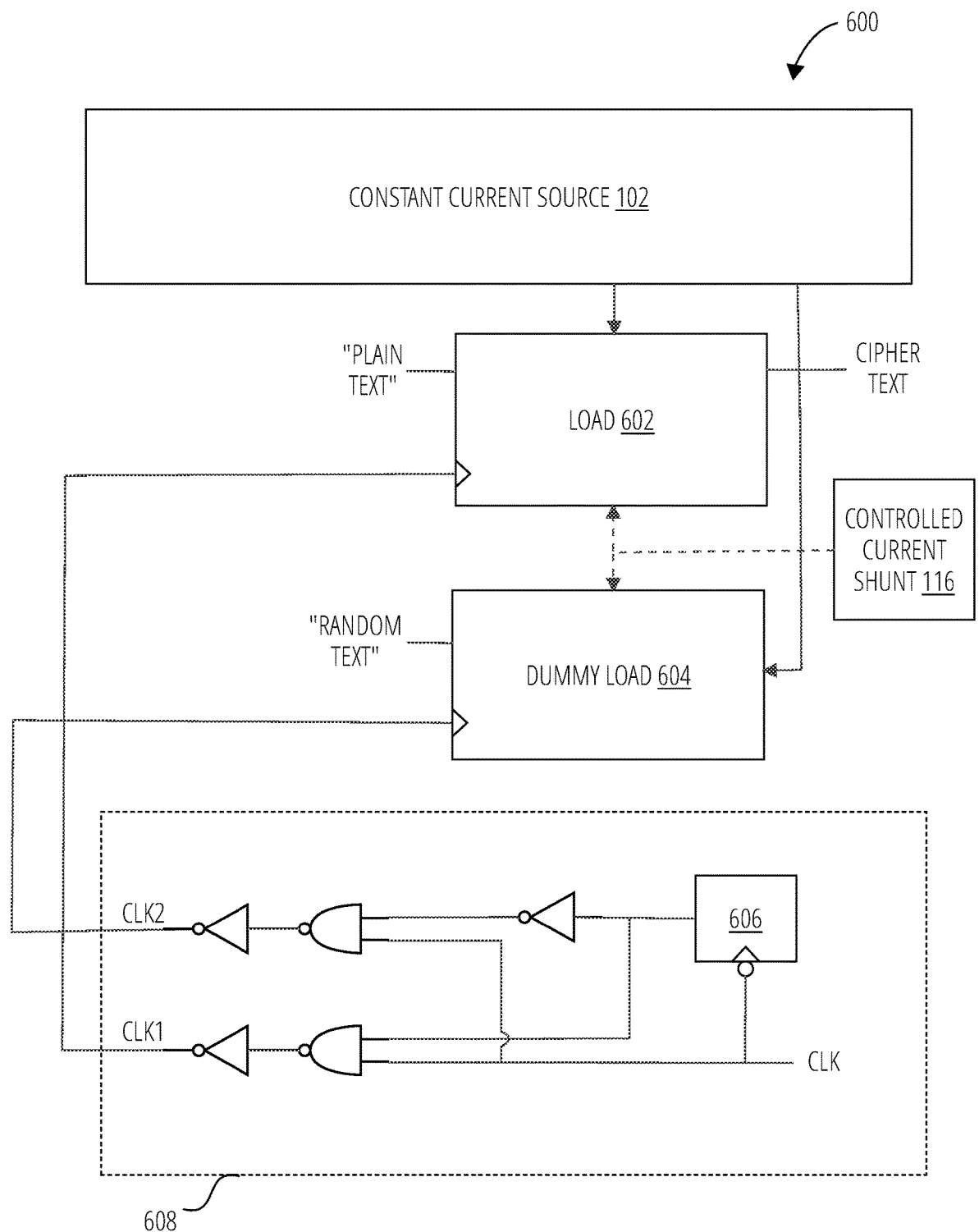
FIG. 6 depicts a dummy loaded circuit 600 in accordance with one embodiment.

FIG. 6 depicts a dummy loaded circuit 600 in one embodiment. At a high level, the dummy loaded circuit 600 comprises a constant current source 102, a controlled current shunt 116, a load 602, a dummy load 604, and a randomizer 608.

The controlled current shunt 116 responds to a load voltage to generate a shunt current or a proportional shunt current for one or both of the load 602 and dummy load 604. Whether or not the controlled current shunt 116 is coupled to both of the load 602 or the dummy load 604, or both, may be selected according to the parameters of the particular implementation. The load 602 transforms a true input (depicted as "plain text", the actual sensitive data to process) into the cipher text ("text" is meant in the cryptography sense, not literally to mean textual input, although it could be). The dummy load 604 performs a transformation of a dummy input (depicted as "random text") that draws a comparable amount of current. In some embodiments the dummy load 604 is a replica of the load 602. The dummy input may also be randomized. The dummy load 604 depicted transforms a random plain text input. The operations performed by the load 602 and/or the dummy load 604 need not be cryptographic in nature; in general, they may perform any type of signal processing. Regardless of the nature of the secure computations to obfuscate, the dummy load 604 should perform processing that is difficult to distinguish from the processing performed by the load 602.

The clock is directed to either the load 602 or the dummy load 604 depending on the randomized output state of the switch control generator 606.

The randomizer 608 in the depicted embodiment comprises a switch control generator 606, three inverters, and two two-input NAND gates. The randomizer 608 accepts a clock signal as input (CLK) to the switch control generator 606 and to a pair of NAND gates. The switch control generator 606 randomly generates a '1' or a '0' output. The output of the switch control generator 606 drives the other input terminals of the NAND gates. CLK 1 to the load 602 and CLK 2 to the dummy load 604 are generated from the outputs of the NAND gates.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:
1. A circuit comprising:
 a load configured to perform a transformation of a true input;
 a dummy load configured to perform a transformation of a dummy input; and a switch configured to direct a clock edge to either the load or the dummy load.

2. The circuit of claim 1 wherein the dummy input is randomized.

3. The circuit of claim 1, further comprising:
a controlled current source configured to respond to a load voltage to generate a shunt current for the load.

4. The circuit of claim 1, further comprising:
a controlled current source configured to respond to a load voltage to generate a shunt current for the load; and
a randomizer coupled to perturb the controlled current source.

5. The circuit of claim 1, the switch configured to alternate between directing the clock edge to the load and to the dummy load.

6. The circuit of claim 1, wherein the switch is configured to direct the clock edge to either the load or the dummy load according to a randomized signal.

7. The circuit of claim 1, further comprising:
a controlled current source configured to respond to a load voltage to generate a shunt current for the dummy load.

8. The circuit of claim 1, further comprising:
a controlled current source configured to respond to a load voltage to generate a shunt current for both of the load and the dummy load.

9. A system comprising:
a first circuit configured to perform a first cryptographic transformation of plain text into cipher text;
a second circuit configured to perform a second transformation of a randomized input into cipher text; and
a third circuit configured to randomly alternate clock edges to either the first circuit or the second circuit.

10. The system of claim 9 wherein one or both of the first circuit and the second circuit receive an output of a controlled current shunt.

11. The system of claim 10, the controlled current shunt configured to respond to a load voltage of the first circuit to generate a shunt current for the first circuit.

12. The system of claim 10, wherein a shunt current generated by the controlled current shunt is randomized.

13. The system of claim 9, the third circuit comprising:
logic to transform a clock signal into a randomized series of logical '1' and logical '0' values.

14. The system of claim 9, further comprising:
the controlled current shunt configured to respond to a load voltage of the first circuit to generate a shunt current for the second circuit.

15. The system of claim 9, further comprising:
the controlled current shunt configured to respond to a load voltage of the first circuit to generate a shunt current for the first circuit and for the second circuit.

16. A method comprising:
performing a first computation with a first circuit;
performing a second computation with a second circuit; and
alternately clocking either the first circuit or the second circuit in a random fashion.

17. The method of claim 16, wherein alternately clocking either the first circuit or the second circuit in a random fashion comprises directing a clock edge from a clock circuit to either the first circuit or the second circuit during each clock cycle.

18. The method of claim 16, further comprising:
randomizing the second computation.

19. The method of claim 16, further comprising:
varying a shunt current to the first circuit, the second circuit, or both.

20. The method of claim 19, the shunt current varied according to a voltage generated to perform the first computation.

21. The method of claim 16, further comprising:
supplying both of the first circuit and the second circuit from a same constant current source.

* * * * *